O. G. FISHEL.
DEPTH GAGE.
APPLICATION FILED JUNE 9, 1916.
1,235,785.
Patented Aug. 7, 1917.
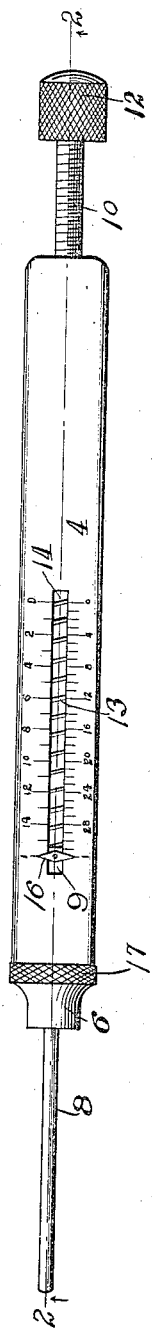
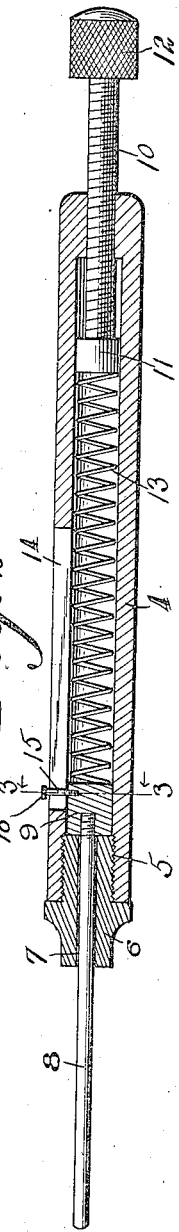
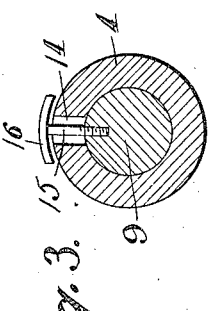
INVENTOR
Orville G. Fishel
BY Richard B. Owen
ATTORNEY
WITNESSES
Roland T. Williams

UNITED STATES PATENT OFFICE.

ORVILLE G. FISHEL, OF FORT DODGE, IOWA.

DEPTH-GAGE.

1,235,785.   Specification of Letters Patent.   Patented Aug. 7, 1917.

Application filed June 9, 1916.   Serial No. 102,744.

*To all whom it may concern:*

Be it known that I, ORVILLE G. FISHEL, a citizen of the United States, residing at Fort Dodge, in the county of Webster and State of Iowa, have invented certain new and useful Improvements in Depth-Gages, of which the following is a specification.

This invention relates to an indicating device, and has for its primary object to provide improved means for accurately determining the depth of apertures or openings.

A further object of the invention is to provide a depth indicator which is of simple and improved construction, which is composed of but few, simple and readily assembled parts all so constructed and arranged as to preclude the liability of breakage, or derangement of the same, which is positive and accurate in operation, which is of small size and little weight, which is so constructed as to be capable of having its parts changed to enable the device to be used in unusually large or small apertures, and which will prove thoroughly efficient in the attainment of the ends for which it is designed.

With these objects in view, together with objects which will appear as the description proceeds, the invention resides in the novel formation, combination and arrangement of parts all as will be described more fully hereinafter, illustrated in the drawings and particularly pointed out in the claims.

The invention will be best understood by reference to the accompanying drawings, wherein:

Figure 1 is an elevation of the measuring instrument constructed in accordance with my invention, Fig. 2 is a longitudinal sectional view taken through the device upon line 2—2 of Fig. 1, and Fig. 3 is an enlarged transverse section taken on line 3—3 of Fig. 2.

Referring now more particularly to the drawings, 4 indicates the instrument body, the same being of substantially tubular construction and of relatively small diameter. One end of the tubular body 4 is interiorly threaded as at 5 for the reception of a threaded bushing 6. The bushing 6 is provided with a longitudinally and centrally disposed bore 7, through which a measuring plunger 8 loosely extends. The plunger 8 is threaded at its inner end, as shown, the said threads being engaged with a head 9 of a diameter substantially equal to that of the inner diameter of the body 4, said head being slidable in the bore of said body.

A screw shank 10 is threaded in the opposite end of the body 4, and carries at its innermost extremity a head 11 of a diameter substantially equal to that of the bore of the body 4. The outer extremity of the screw shank 10 is provided with a knurled member 12, by means of which the screw shank may be readily turned to move the head 11 inwardly or outwardly of the instrument body accordingly as the shank is rotated. The heads 9 and 11 of the plunger and screw shank, respectively, form abutments for the ends of an expansion spring 13. As the head 11 is capable of movement longitudinally of the body 4, only upon rotation of the screw shank 10, it will be seen that the head 11 forms a fixed abutment, while the head 9 is capable of being moved inwardly of the body 4 and against the tension of the expansion spring 13. It will also be observed that the tension of the spring 13 may be varied by manipulation of the screw shank 10.

The body 4 is provided with an elongated slot 14, through which an indicator member in the form of a stem 15 secured to the sliding head 9 extends. This indicating member is provided at its outer extremity with laterally disposed fingers 16, the said fingers being adapted to pass over graduations indicated upon the opposing edges of the slot 14. It is thus seen that the degree of inward movement of the head 9 is indicated by registration of the fingers 16 with the graduations upon the body 4. It will be observed that the graduations upon the body 4 begin at substantially the medial portion of the instrument body, and extend toward the outermost or plunger end of the said body, the graduations increasing from the said medial portion. The distance of travel of the indicating fingers 16 is equal to the distance of travel of the plunger 8 and it will be observed from this construction that upon inserting the plunger end of the instrument within an opening and depressing the body against the tension of the spring 13 until the extremity of the bushing 6 engages the outer edge of the surface within which the opening is positioned, the correct depth of the opening will be indicated by the fingers 16 in registration with the graduations upon the body 4. It is thus apparent that the depth of openings may be readily determined and the length of the sliding plunger 8 and slot 14 may, if desired, be varied. It is also to be observed that the bushing 6 may be replaced by bushings of larger or smaller diameter, to compensate for plungers varying in diameters. The outer portion of the plunger 8 is knurled as at 17, so that the same may be readily attached to and detached from the instrument body.

While the above is a disclosure of the preferred embodiment of the invention, it is apparent that various changes in the minor details of construction and arrangement of parts may be resorted to without departing from the spirit of the invention or exceeding the scope of the claims.

I claim:

1. In a device of the class described, a tubular body having a longitudinally disposed slot, a bushing detachably secured in one end of said body and being provided with a central bore, a head slidably mounted within said body, a stem secured to said head and projecting through said bore, a finger secured to said head and projecting through said slot, a shank threaded through the opposite end of said body, a head on said shank, and an expansion spring interposed between said shank head and said slidable head, substantially as described.

2. In a device of the class described, a tubular body having a longitudinal slot, a screw shank threaded into one end of said body, a head fixed to the inner end of said shank, a plunger in the opposite end of said body being capable of sliding inwardly and outwardly thereof, a head on the inner end of said plunger, a finger carried by said plunger head and extending through said slot, and a spring interposed between said stem head and said plunger head, substantially as described.

In testimony whereof I affix my signature in presence of two witnesses.

ORVILLE G. FISHEL.

Witnesses:
DENNIS M. DOYLE,
CARL G. CARLSON.